United States Patent

[11] 3,591,010

| [72] | Inventors | David B. Pall<br>Roslyn Estates;<br>Cyril A. Keedwell, Jericho, N.Y. |
|---|---|---|
| [21] | Appl. No. | 777,928 |
| [22] | Filed | June 10, 1968<br>Division of Ser. No. 637,850, May 11, 1967,<br>Pat. No. 3,407,252, which is a continuation<br>of Ser. No. 328,297, abandoned. |
| [45] | Patented | July 6, 1971 |
| [73] | Assignee | Pall Corporation<br>Glen Cove, N.Y. |

[54] FILTER HAVING A MICROPOROUS LAYER ATTACHED THERETO
10 Claims, 2 Drawing Figs.

[52] U.S. Cl. .................................................. 210/493,
210/499, 210/505, 210/509
[51] Int. Cl. ............................................... B01d 27/06
[50] Field of Search .................................... 210/493,
499, 500, 510, 496, 503, 504, 505, 506, 508, 509

[56] References Cited
UNITED STATES PATENTS

| 3,062,378 | 11/1962 | Briggs............................ | 210/493 |
| 3,125,515 | 3/1964 | Gruner et al.................. | 210/493 |
| 3,158,532 | 11/1964 | Pall et al....................... | 210/493 X |

Primary Examiner—J. L. DeCesare
Attorney—Janes and Chapman

ABSTRACT: A corrugated filter element having a microporous layer deposited on a substrate sheet provided with portions of reduced porosity at the areas of the base folds of the corrugations.

PATENTED JUL 6 1971 3,591,010

PATENTED JUL 6 1971 3,591,010

FILTER HAVING A MICROPOROUS LAYER ATTACHED THERETO

This application is a division of application Ser. No. 637,850 filed May 11, 1967, now U.S. Pat. No. 3,407,252, issued Oct. 22, 1968, which was a continuation of application Ser. No. 328,297 filed Dec. 5, 1963, now abandoned.

This invention relates to corrugated microporous filter materials characterized by pores whose effective diameter is at most 25 microns, comprising a substrate to which has been applied one or several microporous layers by laydown from a slurry or dispersion of particulate material of the same or different sizes.

THE PRIOR ART

One of the most difficult types of filter to manufacture is a filter having a corrugated base containing ultrafine or micropores, i.e., pores whose diameter is 25 microns or less. Such filters must have substantially no pores whose diameter is beyond the permissible maximum, and this, in view of the small size thereof, is a difficult requirement to meet. Microporous membrane filters have been developed, such as, for example, those described in U.S. Pat. Nos. 1,421,341 to Zsigmondy, 1,693,890 and 1,720,670 to Duclaux, 2,783,894 to Dovell et al., 2,864,777 to Robinson, and 2,944,017 to Cotton. These filters are however not capable of being corrugated, and are quite dependent upon the physical properties of the plastic material used in their preparation. They are frequently brittle and fragile, especially if pore volume is high, and are in any case expensive compared to similar porous media of comparable properties but having unduly large pores, such as paper and nonwoven fibrous bats.

In order to overcome their fragility, attempts have been made to bond on a paper base, but it is difficult to obtain good adhesion between the plastic and the paper, so that the membrane separates or breaks when bent or upon application of an appreciable back pressure differential. Reinforced microporous plastic membranes in which the membrane is supported on a fabric have been prepared, but since these are not sufficiently self-supporting or rigid, the layers tend to separate when formed into the necessary corrugated configuration. For these reasons, plastic membrane composites can be used only in flat sheets, and therefore can have no application in the more efficient corrugated filter elements.

The available paper filters are economical, but unfortunately do not have ultrafine pores. Paper filters having ultrafine pores of about 2 to 4 microns are manufactured, but such products also have a proportion of pores ranging up to 20 microns or more. It is very difficult if not impossible to prepare, at a reasonable cost, papers having both a useful voids volume and substantially no pores more than 10 microns in diameter. This is also true of conventional nonwoven fibrous bats. In addition, such ultrafine pore papers or nonwoven fibrous bats are generally characterized by extremely low fluid permeability, and a high-pressure drop, due to a voids volume of between about 20 and 40 percent, too low for use in many applications, including the filtration of large quantities of viscous fluids.

In copending applications Ser. No. 74,130 filed Dec. 6, 1960, now U.S. Pat. No. 3,158,532 and Ser. No. 98,595, filed Mar. 27, 1961, now U.S. Pat. No. 3,238,056 a method is proposed for impregnating or coating or both impregnating and coating a porous substrate with a particulate material, in order to lay down a microporous layer on the substrate, and obtain a product having a maximum pore diameter of 25 microns.

In copending application Ser. No. 215,151, filed Aug. 6, 1962, now U.S. Pat. No. 3,246,767 a method is proposed for coating a porous substrate with a particulate material in order to lay down a microporous layer on the substrate, and obtain a microporous product having a maximum pore diameter of less than 10 microns and a voids volume of at least 75 percent.

In both cases, the application of the layer includes flowing a dispersion or slurry of particulate material through the substrate to deposit the material and form the layer.

These techniques have given quite satisfactory microporous materials, but difficulties have been encountered in the preparation of such microporous filter materials in corrugated form. If a previously corrugated base is used as the substrate nonuniform microporous layers are produced at the bases of the corrugations, and in some cases the layer is primarily found on the peaks of the corrugations and not in the valleys or bases, thereby defeating the requirement of uniform permeability throughout the surface area. On the other hand, if a flat sheet to which the microporous layer has already been applied is corrugated, the layer tends to flake off or break away from the sheet where it is folded to form the corrugated bends.

Another problem arises from shrinkage of the microporous layer which has been laid down from a liquid dispersion of solid particles as the liquid is driven off or evaporates. Shrinkage may occur even before loss of liquid takes place, when the "bubble point" of the layer is sufficiently high to permit compression or densification when the air/liquid interface meets it when the corrugated substrate is taken from the treating bath. If this compression is large, due to the thickness of the layer, it can cause rupture of the layer even before drying begins. Shrinkage is not harmful in a layer supported on a flat surface, but on the corrugation bends it can cause cracking of the layer, as the layer seeks either to cling to the surface of the substrate, or to separate from the substrate as the shrinkage takes place.

THE NATURE OF THE INVENTION

In accordance with this invention, a process is provided which represents an improvement on the processes disclosed in Ser. Nos. 74,130, 98,595 and 215,151 and which makes possible the preparation of corrugated microporous filters having ultrafine or micropores less than 25 microns in diameter extending from one surface of the material to the other. In this specification and claims, the terms "pore diameter," or "pore size," whether maximum pore diameter or size, or average pore diameter or size, does not refer to a specific physical measurement but refers to a value calculated from the bubble point data, as will be hereinafter described.

The process of the invention upgrades coarse fibrous corrugated substrates by application thereto of a microporous layer thereby reducing their pore diameter to the desired ultrafine or microporous dimensions.

The invention makes possible a corrugated substrate which can receive a uniform coating and/or impregnation of the particulate material without cracking at the bases of the corrugations, or bridging of the corrugations thereby, or shrinkage problems. This requires that the porous substrate be especially prepared for laydown of a microporous layer thereon by flow through of a dispersion of particulate material.

The invention employs a substrate in flat sheet form as the starting material. The preliminary preparation features first that before corrugation the base fold areas of the substrate be treated to reduce their porosity, by at least 10 percent, and preferably from about 15 percent to about 35 percent. This equalizes flow through during laydown. Next, the corrugations are folded both at their bases and at their peaks to a smooth and substantially uniform radius of curvature, which at their bases is above the prescribed minimum of at least 0.025 inch, and preferably within the range from about 0.04 to about 0.06 inch. The radius of curvature of the peaks or tips of the corrugations is not critical, but is determined by available space and length of corrugation sides. Thereafter, if a generally closed configuration, such as a cylinder, is desired, the ends of the corrugated substrate sheet are joined, preferably in a reverse lapped side seal, utilizing a bonding agent.

The radius of curvature, as given above and below, is measured from the center of curvature of the fold to the upstream surface of the substrate; this radius measurement will include the thickness of the substrate for the tip fold, but will not include it for the base fold.

The thus prepared corrugated porous substrate then is ready for laydown of the microporous layer. This is done by one of the processes of Ser. Nos. 74,130, 98,595 and 215,151. Particulate material is suspended in a liquid, and deposited in one or in a plurality of incremental layers upon the substrate, usually on the surface, but also, if desired, within the pores thereof. The layer can also be confined wholly or predominantly to impregnation of the pores. The particulate material can all be of the same size, or of two or more sizes, all suspended in the liquid. Gaseous suspensions are unsatisfactory. The desired degree of microporosity of the deposited layer is obtained by varying the type, size, amount and location (on the surface and/or within the pores) of the particulate material deposited, by blending different sizes of material at different points, if desired, and by carefully controlling the state of dispersion of the material.

If impregnation is desired in place of or in addition to coating, the desired reduction in pore diameter of the substrate is obtained by varying the size and amount of the particulate material deposited in the pores from surface to surface of the substrate, blending different sizes at different points, if desired. The particles can be deposited in any amount at any point in or throughout the pores, so that a porous layer can be obtained which fills the pores from surface to surface or only at one side or in the center of the substrate, as desired.

The invention is illustrated by the accompanying drawing in which.

The filter elements in accordance with the invention are readily prepared from filter sheet material by corrugating and forming. FIGS. 1 to 5, inclusive, show the various steps in the preparation and formation of a cylindrical filter element preliminary to the laydown of the microporous layer thereon.

Figure 1:
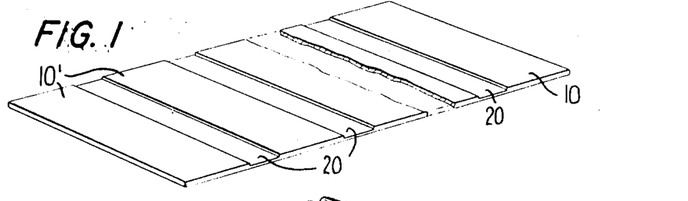
FIG. 1 shows a sheet of filter material ready for corrugation, with the fold areas compressed.

First, a flat porous substrate sheet 10, for example a sheet of a suitable quality of paper, is cut to the desired size, as shown in FIG. 1.

Next, the paper substrate is treated to reduce porosity in the portions to form the base areas of the corrugations. In the illustration, it is compressed along the anticipated base fold lines 20 to a thickness of from 10 to 30 percent, preferably 15 percent, less than the original sheet thickness. By compression, the surface also is made smooth. The spacing of the compressed areas is determined by the desired radius of curvature of each fold at the bases 21 and tips 22, and the length of the sides 23.

Figure 2:
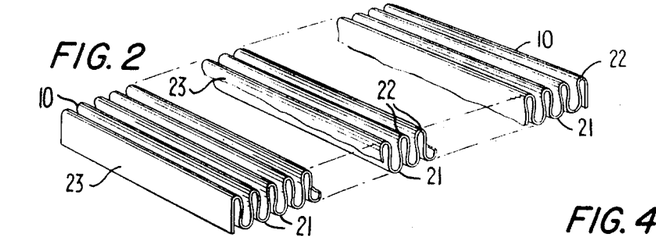
FIG. 2 shows the sheet of filter material of FIG. 1, after it has been corrugated.

The substrate is next formed into a zigzag corrugated configuration as is shown in FIG. 2. Each corrugation fold has a base 21, a tip 22, and sides 23. The folds are so made that the radius of curvature of the base of the fold 21 is at least 0.025 inch, and preferably from 0.04 inch to 0.06 inch. It will be noted in FIG. 2 that the radius of the tips 22 is somewhat larger than that of the bases.

Figure 3:
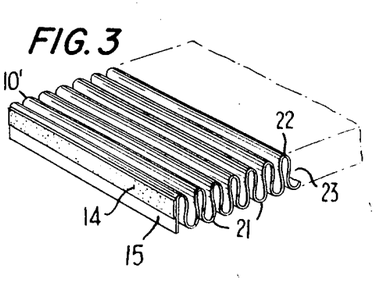
FIG. 3 shows the sheet of corrugated filter material of FIG. 2, after a self-sustaining tape of bonding agent has been applied to the outside surface adjacent one end thereof to form a side scan seal.

Then, as shown in FIG. 3, a ribbon or tape 14 of bonding agent, such as a heat-sealable and curable epoxy resin, which is self-sustaining and of the desired width and thickness, corresponding to the width of the seam, to form a leakproof seal there, is placed on one of the outside faces adjacent one edge of the substrate 10. The tape can be bonded thereto by adhesive, but this is not essential.

Figure 4:
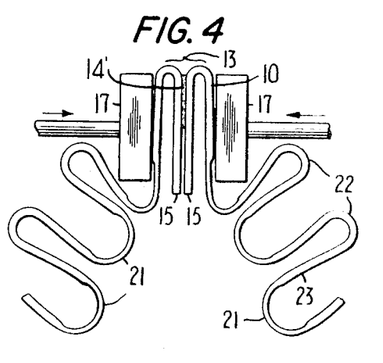
FIG. 4 shows the corrugated sheet of FIG. 3 after folding into cylindrical form, with the two edges brought together so that their outside surfaces are face to face with the tape of bonding agent in between, and the platens in the position of application thereto to form a reverse lapped seam side seal.

This corrugated substrate is then formed into a cylinder, with the two ends of the sheet brought together in such a manner that their outside surfaces 15 are in face-to-face relationship, all as shown in FIG. 4. Two platens 17, which should be heated to a temperature sufficient to bond the tape of bonding agent to the two surfaces, are then brought into contact with the outside lap of the adjacent convolutions of the cylinder, and heat and pressure applied through the double thickness of the sheet material to the tape.

Figure 5:
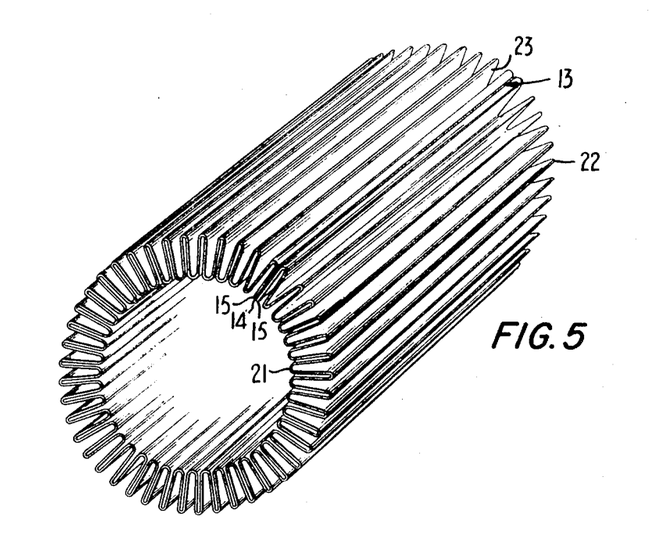
FIG. 5 is a perspective end view of a filter element in cylindrical corrugated form, having a reverse lapped seam side seal in accordance with the invention.

The result is a cylinder with the sheet ends adhered together in a reverse lapped seam side seal, as shown in FIG. 5. It is apparent from the drawing that in this type of seam 13, the amount of "dead" area due to the bonding agent 14 on the outside face of the filer is held to a minimum and that all of the outside surface of the sheet material exposed to the fluid being filtered is available for flow through, except at the thickness of the tape itself 14. Both sides of each corrugation are open to flow through. Furthermore, on the inside of the filter, in the open area available for filtrate flow, there is no resin obstructing the flow of fluid, but instead, the open area exposed is of the same dimensions as that beneath other corrugations of the filter.

It will be understood that more than one sheet may be used to form the cylindrical substrate in which case reverse lapped seam side seals are formed between the ends of each sheet.

The resulting cylinder is ready for use as a substrate for deposition of a surface coating thereon to modify its filtration characteristics. For most uses, cylinders of this type are provided with a supporting core and end caps to close off the interior space enclosed by the element, and give control of the flow of filtrate. One or both of the end caps can be provided with flow passages for filtrate flow. The caps can be of any desired material, appropriate to the system and the need, and are bonded to the cylinder ends in a leakproof seal, by appropriate bonding agents. All of this is conventional and well known to those skilled in this art, and forms no part of the instant invention.

Either before or after the application of end caps, the microporous layer can be applied to the filter substrate to obtain the desired micro or ultrafine porous structure that is the objective of this special preparatory procedure.

This general outline of the procedure is intended to facilitate an understanding of the detailed description which follows. First, however, an illustrative completed filter element of the invention will be considered.

Figures 6, 7:
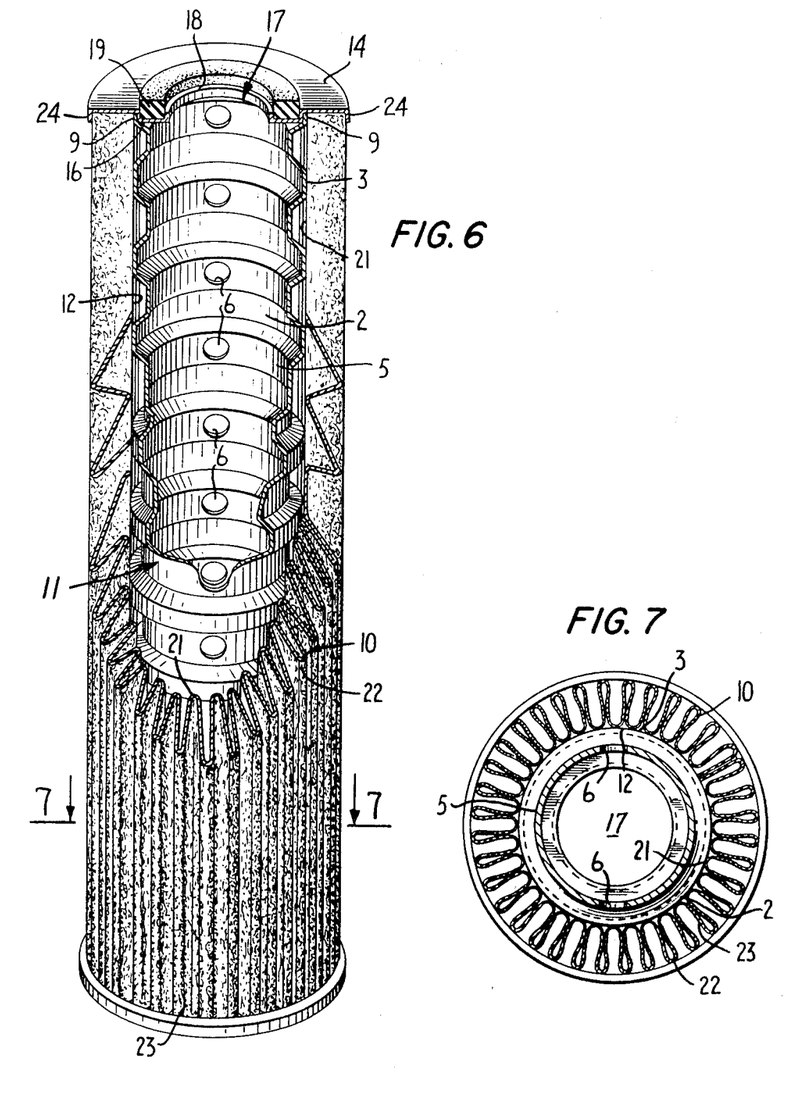
FIG. 6 is a perspective end view of a completed filter element in accordance with the invention after application of a microporous layer, core, and end caps to the element of FIG. 5.
FIG. 7 shows in cross section the filter element of FIG. 6, taken along the lines 7-7, and looking in the direction of the arrows.

A typical completed filter element of the invention as shown in FIGS. 6 and 7, comprises a cylindrical core 11 placed in abutting relationship to constitute the internal support core for the corrugated substrate 10 element of FIG. 5. The element encloses the core 11 tightly in such a manner that the inner bases 21 of the corrugations are in contact with the rib tops 3 on the outer surface of the core.

The depressed portions or grooves 5 between the raised portions or ribs 2 of the core 11 serve as channels for the passage of filtrate from the filter 10, which now comprises a substrate supporting a microporous layer reducing substrate porosity to the desired micro dimensions, to the openings 6 of the core, facilitating passage of fluid from the filter 10 to the central passage 12 for filtrate flow enclosed by the core 11.

The entire filter element is held together by the end caps 14, each of which is provided with an outer flange 24 retaining the corrugated filter, and a central internally raised portion 16 including a flanged aperture 17, end fitting tightly within the flanged end 9 of the core sections 11 as an internal support therefor. Intermediate the flange 24 and the raised portion 16 are two externally raised portions 18 and 19 which are adapted to form a tight seal with a gasket in the filter assembly in which the filter element is used. The raised portion 16 holds the core support firmly in position, and in cooperation with the end flanges 9 thereof, and the filter 10 and flange 15, prevents both lateral and lengthwise displacement of the core sections 11 and filter 10.

The end caps 14 are held in position by bonding to the filter 10 and core sections 11. The flanges aperture 17 is adapted to fit with existing filtrate flow lines of the filter assembly, or with another filter element, via a sealing gasket (not shown).

In operation, fluid to be filtered passes through the filter element from the outside towards the inside, first entering the filter 10, then flowing along a groove 5 formed by the depressed portion of the core sections 11, to and through the opening 6 and into the central passage 12 enclosed by the core sections, whence it can be drawn off through the central opening 17 in either or both of the end caps 14.

THE SUBSTRATE

The substrate can be any porous sheet material whose pores extend from surface to surface, and which is sufficiently formable initially to be folded or bent into corrugated or convoluted configuration, and which will accept such configuration, thereafter, either because of its formability or because it can be set in that configuration, as in the case of a resin-impregnated substrate, which can be heat-cured.

One or several layers of the substrate of the same or varying porosity can be treated. Paper, which can be composed of cellulose or other fibers, and which can, if desired, be resin impregnated, is a preferred base material, since it yields an effective, versatile and inexpensive microporous fluid-permeable medium. Where desired, other formable base materials can be used, such as porous sintered powder sheets of natural or synthetic plastic materials, such as synthetic resins and cellulose derivatives, in the form of formable porous sheets or layers of any desired thickness, such as polyamides, polyurethane (see U.S. Pat. No. 2,961,710), polyvinyl chloride, polyethylene and polypropylene porous sheets, textile fabrics and woven and nonwoven fibrous layers of all kinds, such as felts, mats and bats, made of fibrous materials of any of the types listed below in connection with the particulate material. The porous substrate will have an average pore diameter of not less than about 2.5 microns. Such materials can of course have pores as large as 20 to 25 microns or more.

The substrate, particularly in the case of paper, should have good "sheet formation" to ensure an even coating for uniform permeability; in addition, if it is a resin-bonded paper, the resin should be of a type resistant to the coating media and be evenly distributed through the paper. Phenolic and epoxy resin-bonded papers have been found to be suitable.

The substrate should have a thickness within the range from about 0.015 to about 0.08 inch, with from 0.035 to 0.06 inch being preferred for general use.

Although the thinner the substrate, the more corrugations may be fitted into the same volume, it is preferable that the substrate be at least 0.015 inch in thickness to facilitate edgewise flow. This is desirable because as may be seen in FIGS. 6 and 7, the bases of the folds of a finished filter are comparatively close together, and may be in contact over a considerable portion of their side length. In use, the fluid to be filtered which passes through the tip 22 or sides 23 of the substrate will have less open area within which to drain down than the fluid which flows through the base folds of the substrate into the open interior of the cylinder. Hence, edgewise drainage through the paper becomes important, as a factor in increasing flow capacity of the final filter, and to this end the substrate preferably is at least 0.015 inch thick, and has continuous passageways within it to produce edgewise drainage.

PREPARATION OF THE SUBSTRATE FOR CORRUGATION

AND APPLICATION OF THE MICROPOROUS LAYER

The initial step in preparation of the substrate sheet for corrugation is treatment thereof in the preselected corrugation base fold areas (21 of FIGS. 1 to 7, inclusive) to reduce porosity by at least 10 percent, and preferably by from 15 to 35 percent. There is no upper limit save that to ensure uniformity of deposition of the microporous layer.

During flow-through a corrugated sheet, it is difficult to obtain adequate laydown at the tips of the corrugations facing the direction of flow. The reduced permeability at the base areas restricts flow at such areas and ensures uniformity of laydown of the particulate material on all surface areas of the substrate.

Permeability at the base fold areas can be reduced by any of several techniques. A preferred method is to compress or densify such areas by at least about 10 percent. The substrate also can be treated with a coating or impregnating material solely at these areas to reduce porosity by at least 10 percent. Rollercoating, spraying or painting can be used in application of the coating. Piller or sizing materials can be used, such as colloidal silica, colloidal alumina, titanium dioxide, bentonite clay, attapulgite clay and starch. The filler or size can be permanent or temporary, in which latter case it is removed when the filter sheet is finished. Synthetic resins also can be used, in which case any of the resinous bonding agents referred to hereinafter can be employed.

The surface of the substrate opposite that at which the laydown is being effected can be partially coated with a plastic or filler material as described above in connection with limiting permeability of the corrugation tips and bases to reduce the pore diameter at that surface. Alternatively, the substrate can be backed by a layer having finer pores, which layer can be arranged to form a part of the final product, for example, by bonding it to the substrate to form a laminate, or which can be merely in contact therewith, and removed after deposition or blockage of the pores has been effected. Some substrates such as paper have tapered pores, due to a greater density on one side than on the other, arising during laydown of the paper fibers. In this event, the slurry can be applied from the less dense side, using material too small to pass through the pores on the denser side.

The location of the base and tip areas on the preliminarily so-treated substrate is determined by the dimensions of the corrugated filter that is desired, bearing in mind that in forming the corrugations the minimum radius of curvature for the base areas is 0.025 inch, and preferably from about 0.04 to about 0.06 inch. The radius of curvature of the tips is not critical, but should be at least 1.3 times the thickness of the substrate prior to treatment to reduce porosity.

The higher the surface area of a filter available for filtration in a given volume, the longer the life of the filter, since surface area is directly correlated with dirt capacity. Hence, the corrugated filter should be designed for maximum utilization in surface area of the volume it occupies, taking into account the critical minimum radii stated heretofore at the bases of the corrugations. Usually, therefore, the radius of curvature of the folds will be as close to the 0.025 inch minimum as possible, since this determines the number of folds that can be fitted in the available volume, and hence total surface area. This is most readily achieved in the case of thin substrates, whose thickness is less than about 0.035 inch. The radius of curvature of the corrugation tips can be enlarged considerably without danger of reducing the spacing diameter between corrugations to such a degree as to increase the danger of the coating's bridging the space. A moderate enlargement of the tip curvature as compared to base curvature usually is desirable, since it prevents local overstressing of the base material. It also improves drainage from the tips of the corrugations, and contributes to the longitudinal rigidity of the structure. The areas intended for the tip and base folds accordingly are dimensioned from a consideration of these factors.

The length of the filter is not critical. If, because of the length, additional rigidity is needed, a stiffener or core of any conventional type can be inserted in the filter, as described above, and shown in FIGS. 6 and 7.

A smooth radius of curvature at the tips and bases is facilitated by compressing or densifying the substrate by at least 10 percent from about 15 percent to about 35 percent of its thickness. This local densification prevents nonuniform folding and buckling of the surface when corrugation bending takes place. The strain is then taken uniformly by the outside radius.

This compression is most readily obtained in the corrugating operation. If, for instance, the substrate is passed between corrugating rollers, the roller surfaces can be so dimensioned as to impart the desired compression at the tips and bases of the folds, by providing less clearance there for the substrate. The same technique can be used for reciprocating blade corrugating machines.

A further advantage from the densification is that approximately 5 percent more corrugations can be put into a given circumference, due to the compression of the substrate.

It is desirable not only that the substrate material be uniformly porous but also that the drainage from the corrugations be adequate. This is particularly important in coatings or impregnations of high permeability, where the pressures required to force fluids through the substrate can be almost equal to the restriction due to the coating or impregnation itself. If the bases of the corrugations are as close together as possible, which is always desirable to keep package volume to a minimum, there is little drainage space between the folds. Hence, it is an advantage to use a thick substrate, since edgewise flow can occur through it, supplementing the drainage outside the substrate. Because of such edgewise drainage, the pressure drop through the filter element is inversely proportional to the thickness. The result of inadequate drainage is excessively thick coatings at the bases of the corrugations and thinner coatings at the tips. In a design where the radius of curvature at the bases is already at a minimum, the coating cannot be made thicker to compensate for this effect, since bridging across the corrugations and cracking of the coating may occur.

The corrugated substrate in the form of FIG. 2 can be employed as such for laydown of the microporous layer, if it is to be employed as a sheet in the ultimate end use. If, however, it is to be used in a closed configuration such as a tube which is polygonal, square, elliptical or cylindrical in cross section, then it is preferably put in that configuration before laydown. In such closed configurations, the ends of the corrugated substrate sheet are joined by means of a reverse lapped side seam seal (as best shown in FIG. 4).

The substrate can be formed into the desired configuration by any available equipment. This equipment is known to the art, and details need not therefore be given. Corrugating rolls and reciprocating corrugating blades can be employed in corrugation, for example, and by like techniques the substrate can be formed into other shapes.

The equipment will be capable of forming the folds to a uniform radius of curvature, and compression in selected areas can be obtained by a differential in spacing or clearance at such areas. Also, one roll or blade can be made of more resilient material, to apply a lesser pressure in selected areas.

The shaped substrate should retain the form thus imparted to it. If it tends to draw away from this shape, due to resiliency or creep or other fault, it should be set in this form. Set can be imparted at any stage in the procedure. Substrates impregnated with a bonding agent, including for instance the bonding agent of the anchoring and/or microporous layer, will acquire the desired set when the bonding agent is cured. The substrate can be pretreated with a bonding or setting agent before forming, and set by using heated forming equipment, such as hot rolls or blades. Any of the best curable bonding agents suggested for the anchoring or microporous layer can be used.

Tubular filter elements as conventionally used are arranged to accept fluid flow from the outside surface of the tube through the filter to the inside of the tube, whence the filtrate flow is drawn off. In the manufacture of tubular filter elements from one or more sheets of filter material, it is customary to fold the sheet or sheets into the form of a tube, and lap the opposite ends of the sheets in a side seam which is bonded with an adhesive coating between the faces. In forming the seam, usually the two inside faces of the ends of the sheet are brought together, one or both of the faces is coated with adhesive before the faces are brought in contact and the seal then formed by application of heat and pressure to set the adhesive. Less frequently, a lapped seam is formed in which the inside face of one end of the sheet is lapped over the outside face of the other end, one or the other of the two faces to be put in contact is coated with adhesive, and sealing then effected as before. In either case, a lapped seam is formed which, due to the adhesive, is impervious to the flow-through of fluid being filtered, thus resulting in a "dead" or nonporous area on the filter surface.

The presence of the "dead" area results in a nonuniform flow pattern across the surface of the tube. Not only that, but when a microporous layer is to be deposited therein by flow-through, as in this invention, it becomes quite difficult to obtain a uniform application in the area of the tube at and adjacent to the seal, because of the absence of flow-through at that point. These difficulties are accentuated in the case of a corrugated tube, because of the hill-and-dale configuration.

Preferably, therefore, in forming a tube from the substrate after corrugation and prior to laydown, a reverse lapped seam side seal is provided where in outer surfaces of the adjacent sheet edge portions are brought together in face-to-face relationship, with a self-sustaining ribbon of a bonding agent therebetween, bonding the sheet portions together to form a leakproof seal. When the outer surfaces of the adjacent sheet portions are face to face to form the seam, the "dead" area exposed at the outside surface of the substrate to the fluid system used for laydown and not available for flow-through the substrate is held to a minimum. Furthermore, the surface of the seam exposed to the fluid system includes an end surface instead of a side surface of the substrate, and extends from the inside of a peak of a corrugation, rather than at the base, as in the normal seam, thus minimizing disruption of flow-through, and facilitating the laying down of a coating and/or impregnation of the substrate.

Thereafter, the substrate is ready for application of the microporous impregnation and/or coating, as may be desired. These require generally similar but in some aspects different techniques which are now described in detail.

Usually, it is desirable, but it is not essential, to bond the microporous layer to the substrate. This bonding can be effected by incorporating a bonding agent in the layer, either at the time it is laid down, or thereafter in a separate treating step. The bonding agent can be included in the substrate prior to laydown, or in the dispersion employed to lay down the layer.

For maximum adhesion of the microporous layer to the substrate, it is preferred to lay down an anchoring layer on the substrate, prior to laydown of the microporous layer. The anchoring layer includes not only a bonding agent for the microporous layer but also a particulate material to add substance to the layer. Details on the anchoring layer will now be given.

THE ANCHORING LAYER

1. Composition of the Layer

In order to obtain strong adhesion between the substrate and the particulate material deposited thereon, where the product is desired to withstand reverse flow, and mechanical abrasion, the substrate is preferably first treated with an anchoring dispersion comprising a liquid or liquefiable bonding agent and a particulate material which is wetted by the bonding agent. Thereafter, the microporous layer is laid down by application of the selected dispersion, and the substrate then is treated, by heating or other means, to effect adhesion of the microporous layer to the substrate by the anchoring layer.

The anchoring layer includes as the essential component a bonding agent, and desirably, a particulate material. The anchoring layer can be discontinuous or continuous on the substrate; continuity is not required, since the microporous layer can determine microporosity.

The bonding agent employed in the anchoring layer must be a liquid or capable of being liquefied at the time adhesion is to be effected, and thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol-formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic, or heterocyclic and may be substituted if desired with substituents, such as chlorine atoms, hydroxyl groups, ether radicals, and the like. They may also be monomeric or polymeric.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1.4-bis(2.3-epoxypropoxy) benzene, 1,3-bis(2,3-epoxypropoxy) benzene, 4,4'-bis(2,3-epoxypropoxy) diphenyl ether, 1,8-bis(2,3-epoxypropoxy)-octane, 1,4-bis(2,3-epoxypropoxy 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl)-propane (Bisphenol A), 2,2-bis(4-hydroxy-phenol)-butane 4,4'-dihydroxybenzophenone, bis (4-hydroxy-phenyl)ethane, 2,2-bis(4-hydroxy-phenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula wherein R represents a divalent hydrocarbon radical of the dihydric phenol. The polymeric products will generally not be a single simple molecule but will be a complex mixture of glycidyl polyethers of the general formula wherein R is a divalent hydrocarbon radical of the dihydric phenol n is an integer of the series 0, 1, 2, 3, etc. While for any single molecule of the polyether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals in hydrated form.

The preferred glycidyl polyethers of the dihydric phenols may be prepared by reacting the required proportions of the dihydric phenol such as Bisphenol A and the epichlorohydrin in an alkaline medium. The desired alkalinity is obtained by adding a basic substance, such as sodium or potassium hydroxide, preferably in stoichiometric excess to the epichlorohydrin. The reaction is preferably accomplished it temperatures within the range of from 50° C. to 150° C. The heating is continued for several hours to effect the reaction and the product is then washed free of salt and base.

Any known type of curing agent can be employed in conjunction with the polyepoxide resins employed in this invention. For example, organic amines and quaternary ammonium compounds as in U.S. Pat. No. 2,506,486, acidic organic orthophosphates as in U.S. Pat. No. 2,541,027, sulfonic acid or sulfonyl halides as in U.S. Pat. No. 2,643,243 and acid anhydrides either alone or with activators as in U.S. Pat. No. 2,768,153. The organic amines are particularly preferred since they give the fastest rate of solidification. Aliphatic amines such as dimethylamine, trimethylamine, triethylamine, 1,3-diaminopropane, hexamethylene diamine, diethylene triamine, triethylene tetramine, octylamine, decylamine, dioctylamine, and dodecylamine are exemplary of primary, secondary and tertiary aliphatic amines. The aliphatic amines preferably have from one to 12 carbon atoms. Also useful are the aromatic amines such as phenylene diamine, di(methylaminomethyl)phenol, tri(dimethylaminomethyl)phenol and diethylaniline.

The acid anhydrides are also quite useful as curing agents. These compounds are derived from mono or preferably, polycarboxylic acids, and possess at least one anhydride group.

Z represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclo-hexadiene-1,2-dicarboxylic acid anhydride, dodecenyl succinic acid anhydride, tetrahydrophthalic acid anhydride, pyromellitic dianhydride, and the like. Other anhydrides which can be used will be found mentioned in U.S. Pat. No. 2,768,153.

Also useful bonding agents are solutions of solid thermosetting resins in suitable solvents.

Thermoplastic solid binders can also be employed as long as they can be softened to a tacky state, or liquefied, as by heating to above their softening point, to effect adhesion. Such thermoplastic materials can be employed, alone or in solution in a suitable solvent. Typical thermoplastic binders include polyethylene, polypropylene, polymethylene, polyisobutylene, polyamides, cellulose acetate, ethyl cellulose, copolymers of vinyl chloride and vinyl acetate, polyvinyl chloride, polyvinylidene chloride, polyvinyl butyral, polytetrafluoroethylene, polytrifluorochloroethylene ligninsulfonate resins, starch binders, casein binders, and terpene resins, polyacrylic resins, such as polymethyl methacrylate, alkyd resins, and synthetic rubbers such as butadienestyrene polymers.

As the particulate material, any of the particulate materials employed to form the microporous layer can be used (see later, THE MICROPOROUS LAYER). Nonfibrous materials preferably have an average diameter of from 0.01 to 25 micron. When it is desired to impregnate the substrate with the subsequent laydown (as opposed to coating it) particulate materials small enough to enter the pores of the substrate are preferably used in the anchoring layer without fibers. Preferably, if impregnation of the substrate pores is not desired, a fibrous material is employed, having an average diameter of from about 0.005 to about 7 microns, and an average length of from about 10 to about 1,000 microns, and preferably an average diameter of from about 0.01 to about 0.5 micron and an average length of from about 15 to about 500 microns. At least 10 percent by weight of a fibrous material based upon the total weight of particulate material substantially prevents the anchoring particles from entering the pores of the substrate.

The fibrous and/or nonfibrous particulate materials in the anchoring dispersion should be wetted by the liquid or liquefiable bonding agent employed.

2. Preparation of the Anchoring Dispersion and Application to the Substrate

The anchoring dispersion preferably contains from about 0.1 to about 5 parts by weight of particulate material per 100 parts by weight of dispersing liquid and from about 8 to about 2000 parts by weight of bonding agent per 100 parts by weight of particulate material, preferably at least about 200 parts of bonding agent per 100 parts of particulate material.

Sufficient anchoring dispersion should be applied to the substrate to deposit from about 5 to about 50 grams of bonding agent per square foot of surface area. The particulate material serves not only as an anchor for the bonding agent, but also as a means for filtering and holding particles of bonding agent which would otherwise pass through the substrate. The anchoring layer preferably is a continuous layer, but this is not essential. After the anchoring dispersion has been applied to the substrate, the coating and/or impregnating dispersion can be applied.

The dispersing liquid used in preparing the anchoring dispersion can be any liquid which is inert under the conditions of use, such as any of the liquids used in applying the microporous layer (see THE MICROPOROUS LAYER).

In preparing the anchoring dispersion, the bonding agent is preferably mixed with the particulate material and the mixture is then added to the dispersing liquid with agitation, to create a stable dispersion. When the particulate material is prewetted with the bonding agent in this manner, the droplet size of the final dispersion is coarser than when the particulate material and the bonding agent are added separately to the dispersing fluid. To stabilize this coarser dispersion, it is preferred that the final anchoring dispersion have a viscosity in excess of about 400 centipoises at 25° C. The viscosity of dispersing fluid can be increased by the addition of any of the well known viscosity-increasing soluble high molecular weight materials.

An alternative method of preparing the anchoring dispersion, which can be used to insure that the particulate material will be sufficiently wetted by the bonding agent involves the use of a bonding agent dissolved in a suitable solvent. The bonding agent is insoluble in the dispersing fluid while the solvent is soluble therein. The particulate material and the bonding agent solution which can be premixed if desired, either in whole or in part, are added to the dispersing fluid. The solvent dissolves in the dispersing fluid, causing the precipitation of the bonding agent on the fibrous material. The viscosity of the fluid dispersion is sufficient to prevent any of the bonding agent or particulate material from settling out before application to the substrate.

In this alternative method of preparing the anchoring dispersion, there is preferably present in the dispersion both a fibrous and a nonfibrous particulate material. The nonfibrous material preferably has an average particle size of about 0.005 to 2 times the average diameter of the fibrous material. The solvent employed can be any solvent for the bonding agent that is soluble to the extent of at least 1 percent by weight in the dispersing fluid either at room temperature or at an elevated temperature. For example, where the bonding agent is polyepoxide and the dispersing fluid is water, suitable solvents that can be employed include butyl acetate, butyl carbitol, methyl ethyl ketone and furfuryl alcohol.

Where the particulate material is preferentially wetted by the bonding agent rather than by the dispersing fluid, the order of mixing the components in forming the anchoring dispersion is unimportant.

THE MICROPOROUS LAYER

1. Composition of the Layer

The microporous layer contains as the essential component one or more particulate materials. It also may include a bonding agent, and for this purpose, any of the bonding agents employed in the anchoring layer can be used. The relative proportions are not critical. The particulate material is selected to give a layer of the desired characteristics, and the bonding agent is used in a sufficient amount to obtain good adhesion, supplementing the anchoring layer.

As the particulate material, fibrous material is preferred, because of its versatility, greater case of deposition, and greater strength imparting properties, and because fibers can be deposited in a position at an angle to the base. A great variety of diameters of fibers are available, thus making it possible to achieve a very large assortment of mixtures of different diameter fibers for making fibrous material of any porosity, and such fibers can be made of any length, within the stated range, so as to take advantage of the greater cohesiveness of a layer of long fibers, as compared to granular material layers. Typical fibrous materials include glass, quartz, asbestos, potassium titanate, colloidal aluminum oxide ("Baymal"), aluminum silicate, mineral wool, regenerated cellulose, micro-crystalline cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, metallic fibers such as iron, copper, aluminum, stainless steel, brass, Monel, silver and titanium, and clays with acicular lathlike or needlelike particles, such as the montmorillonite, sepiolite, palygorskite, and attapulgite clays of this type.

Nonfibrous particulate materials can be used but preferably are used only in admixture with fibrous materials. In order to achieve the requisite microporosity and voids volume, it is desirable to employ the nonfibrous material in admixture with at least 10 percent by weight fibrous material. The nonfibrous particles employed should have an average diameter of less than 10 microns. Nonfibrous materials containing a fine internal structure or porosity such as diatomaceous earth are preferred.

Typical nonfibrous particulate materials are diatomaceous earth, magnesia, silica, talc, silica gel, alumina, quartz, carbon, activated carbon, clays, synthetic resins and cellulose derivatives, such as polyethylene, polyvinyl chloride, polystyrene, polypropylene, ureaformaldehyde, phenol-formaldehyde, polytetrafluoroethylene, polyamides, polytrifluorochloroethylene, polymers of terephthalic acid and ethylene glycol, polyacrylonitrile, ethyl cellulose, and cellulose acetate-propionate, and metal particles such as aluminum, silver, platinum, iron, copper, nickel, chromium and titanium and metal alloys of all kinds, such as, Monel, brass, stainless steel, bronze, Inconel, cupronickel, Hastelloy, beryllium and copper.

When particulate materials are deposited from a liquid on a substrate, tortuous passages of varying sizes exist between the particles. These passages in the aggregate have a mean pore size which determines the effective pore diameter of the microporous layer, and which depends on:

1. The dimensions (diameter or diameter and length) of the particles;
2. The shape of the particles;

3. The internal structure of the particles (as for example, when diatomaceous earth is used);
4. The average distance between adjacent particles;
5. The state of aggregation and uniformity of spacing of the particles.

The size of the particulate material can be so chosen as to be larger than, equal to, or smaller than the pore diameter of the base. Very few pores are straight through, and a smaller particle or fiber, particularly one which is acicular in shape, is likely to encounter an obstruction and lodge against the wall of the pore just below the surface of the base, blocking passage of any remaining particles and fibers.

The microporous layer can also include as adjuncts substances which impart special effects to the fluid passed through the finished filter, such as bactericides, mildew proofing agents, mothproofing agents, fungicides, miticides, and the like. These ingredients may be dissolved in the fluid as it passes through the filter. Eventually, of course, they will be leached out, but enough is added to last the life of the filter, which in any case can be used only until plugged by the suspended matter removed from the fluid.

Bactericidal filters thus are obtained which not only filter out the bacteria because of the small pore size of the filter, but which also kill the bacteria thus removed, preventing a catastrophe in case of accidental rupture of the filter, which would otherwise release the pent-up bacteria downstream. Bactericides such as sparsely soluble nontoxic silver salts, capable of releasing small nontoxic concentrations of silver ion to water can be used, such as silver chloride, silver bromide and silver iodide, silver oxide or silver sulfide. The silver component can be coated on the particulate material, or simply dispersed with it in the application dispersion, or applied to the microporous layer after laydown from a separate dispersion or slurry. Similar application procedures can be used for other adjuncts.

The particulate material itself can be an ion exchange resin. Such resins also may be included as adjuncts. If serving as the particulate material, the resin will be of a particle size, granular or powder, suited to the desired microporosity of the microporous layer, according to the principles outlined above. If serving only as an adjunct, it will be of a particle size not to alter unduly the desired microporosity.

Such materials are well known, and any of the known cation and anion exchange materials can be used. They are characterized by a polymeric matrix to which are attached functional groups capable of reaction with cations and anions.

Suitable active acidic functional groups linked to a polymeric matrix include —$SO_3H$, —COOH and the like, —$SO_3H$ being preferred because of its high dissociation constant exceeding $10^{13}$ in suitable resin-forming compounds. The exchangeable hydrogen ion may be partially or completely substituted by other substantially dissociated cations such as the alkali metal ions, the alkaline earth metal ions —namely, calcium, strontium, barium and radium—and also silver, copper, magnesium and ammonium ions, and the like. Typical polymeric matrices to which the functional groups are linked include phenol-aldehyde resins; polystyrenedivinylbenzene copolymers and the like. Similarly suitable active basic groups linked to polymeric matrices include quaternary ammonium hydroxides amino groups, the guanidyl group, the dicyandiamidine group and the like organic nitrogen containing basic groups.

Quaternary ammonium hydroxide groups, the guanidine and the dicyandiamidine residue are among the preferred basic groups because of their high dissociation constant exceeding $10^{13}$. Typical polymers to which active basic groups are linked include the urea-formaldehyde type resins, the melamine-formaldehyde type resins, the polyalkylene-polyamine-formaldehyde resins and the like. The exchangeable hydroxyl ions may be partially or completely substituted by other substantially dissociated anions such as $Cl^-$, $NO_3^-$, $SO_4^-$, and the like.

2. Preparation of the Microporous Layer Dispersion and Application to the Substrate The liquid used for the dispersion is preferably inert to the particulate material and the substrate. It should not dissolve a substantial amount thereof, although if the liquid is reused, the fact that some material or substrate is in solution is not a disadvantage, since a saturated solution is quickly formed. The liquid should be volatile at a reasonably elevated temperature below the melting point of the particulate material and substrate to facilitate removal after laydown. However, nonvolatile liquids may be desirable under certain conditions, and those can be removed, by washing out with a volatile solvent that is a solvent for the fluid but not for the particulate material. The liquid can be the same as the liquid to be filtered by the final filter.

Typical liquids are water, alcohols, polyalkylene glycols, such as polyethylene glycols, poly 1,2-propylene glycols, and mono and di alkyl ethers thereof, such as the methyl, ethyl, butyl and propyl mono and di ethers, dialkyl esters of aliphatic dicarboxylic acids, such as, di-2-ethyl-hexyl adipate and glutarate, mineral lubricating oils, hydraulic fluids, vegetable oils and hydrocarbon solvents such as xylene and petroleum ether, silicone fluids, chloro, bromo and fluoro hydrocarbons, such as the Freons. Since the final product is permeable to any liquid, depending upon the choice of particulate material, obviously a wide selection of fluids is available, and such would be known to one skilled in this art.

The pore size and voids volume of the microporous layer or layers laid down on the substrate is determined not only by the particulate material dimensions but also by the state of suspension or flocculation thereof in the dispersion.

The state of suspension helps to determine whether particles are retained on the surface of the substrate, or penetrate within the pores. If the dispersion is heavily flocculated, all the particles are retained on the surface. If the particles are well deflocculated, the particles smaller than the pores of the base will tend to enter therein, and indeed to pass through.

The state of suspension required for forming a layer of the desired pore size and voids volume for a given fiber or fiber mixture is determined by trial and error, and the parameters required to duplicate the successful experiment determined by a few simple measurements.

The degree of flocculation of the dispersion is measured by titration with a solution capable of flocculating the dispersion, such as magnesium sulfate of aluminum sulfate solution, for fiber dispersions having a pH above about 7, or sodium carbonate or sodium hydroxide solution for fiber dispersions having a pH below 7. The test solution suitably can have a fiber concentration of 1 g/1, and the titrating solution a concentration of 5 percent of the active agent. The turbidity of the dispersion is observed by a colorimeter during the titration, and the desirable degree of flocculation determined in terms of this turbidity. Succeeding dispersions can be made to this turbidity. Any desired flocculating property can be obtained by addition of the appropriate amount of dispersant or flocculating agent, in terms of the required turbidity as determined by this test.

In order to make a dispersion less flocculating, a dispersing agent can be added. Any dispersing agent known to disperse the particulate material used can be employed. The dispersing agent should also wet the substrate. These can be of the type used in the papermaking trade, such as the alkali metal polyphosphates, for example, sodium hexametaphosphate, sodium pyrophosphate, sodium metasilicate, pentasodium tripolyphosphate and sodium metaphosphate, as well as any synthetic surfactant or organic emulsifier, such as are described in Schwartz and Perry, "Surface Active Agents."

In order to make dispersion more flocculating, a flocculating agent can be added. This can be of the type used in the papermaking trade.

Exemplary dispersing and flocculating techniques for selected fibrous materials are as follows:

should also serve as a wetting agent for the substrate, and therefore should not only disperse the particulate material but should also wet the substrate. If no dispersing agent is used, a wetting agent may be desirable. Potassium titanate, for example, does not always require a dispersing agent to form a sufficiently stable slurry in water, but a wetting agent may be required to obtain adhesion to certain substrates, such as paper, glass, wool and synthetic resins.

From 0.001 to 5 percent of a wetting agent is usually sufficient. Anionic, nonionic and cationic wetting agents can be

| Fiber | For dispersion | For flocculation |
| --- | --- | --- |
| Amosite type amphibole asbestos | Add Tamol 850 (a water soluble sodium salt of polyacrylic acid) | Add an excess of sodium carbonate. |
| Crocidolite type amphibole asbestos | Add Tamol 850 | Do. |
| Chrysotile asbestos | Add Tamol 850 or sodium hexametaphosphate | Do. |
| Glass | Maintain pH at about 3 | Increase or decrease pH from 3. |
| Potassium | Add a dispersing agent prepared by mixing 53.4 parts of mixed ammonium and ethanolamine salts of alkyl sulfuric acids derived by sulfation of the alcohols obtained by reducing coconut oil, 15 parts of the monoalkylolamide of coconut oil fatty acids and monoethanolamine, 2 parts of electrolyte (chloride and sulfate of monoethanolamine), 24 parts of ethanol and 5 parts of water. | No special conditions needed. |

The flocculating agent can be added to the dispersion after the desired amount of material has been applied to the substrate to effect deposition. It also can be applied to the substrate to effect deposition. It also can be applied to the base before the dispersion, to ensure deposition as soon as it blends with the slurry. In a case of this type, it is preferred that the slurry be on the verge of instability and deposition, so that flocculation and deposition promptly follows blending with even small amounts of flocculating agent.

Some particulate materials tend to flocculate others, due to, for example, a difference in charge on the particles. For example, potassium titanate fibers are flocculants for asbestos fibers. Addition of the former to the latter therefore results in flocculation.

The amount and location of deposited particles also can be controlled by control of deposition through a varying of the size of particulate material introduced, or by the amount of agitation applied to the slurry during deposition.

A dispersion which tends to flocculate while quiescent can be dispersed by agitation. As soon as agitation ceases, as upon application to the base, the instability of the slurry results in deposition. Thus, such a dispersion can be applied through a moving apertured plate held closely to the substrate, so that turbulence produces a fine dispersion that settles out after application when agitation is less or nonexistent.

To obtain the highest flow rate or permeability, the amount and depth, if any, of impregnation of the substrate should be as little as possible. Greater penetration of the substrate beyond a depth of two to three fiber diameters or about 100 microns should be avoided, in order to prevent undue reduction in flow rate through the substrate. As noted above, flow rate varies directly with the ratio of voids to fiber volume, i.e., the percentage of voids present. The anchoring layer will inhibit impregnation of the substrate and hence reduction in the voids volume of the substrate, and thus leads to an increase in this ratio and hence in the flow rate.

The amount of dispersing agent and flocculating agent, if used, should be selected with care, since if too much dispersant is used, the particulate material may pass right through the substrate, particularly if an anchoring layer is not present, whereas if too much of the flocculating agent is used, the dispersion is unstable, and the particulate material will not form a suitable coating. However, the relative amounts are readily determined by trial and error in each case, in relation to the particles, their size, the temperature of deposition, the hardness of the water, the solids content of the dispersion, and the pore opening of the substrate. Usually, from 0.001 to 5 percent of dispersant and from 0.001 to 5 percent of flocculant are satisfactory. These can be used separately as described, or together in the slurry in amounts to give a dispersion until deposition.

A wetting agent which wets the substrate can also be incorporated in the dispersion. If a dispersing agent is used, this used.

Any method of applying the dispersion to the substrate which causes the dispersing fluid to flow through the substrate can be used. For example, the dispersion may be subjected to a differential pressure by applying a direct pressure to it, or by applying a vacuum to the underside of the substrate. An anchoring layer helps to prevent particulate material in later applied dispersions from passing through the substrate.

The compression and hence bulk density of the microporous layer can be varied by varying the differential pressure across the layer during deposition. The differential pressure is in turn dependent upon fluid velocity and viscosity, and the permeability of the substrate. For a given differential pressure, the layer density can be decreased by including a small amount of bulked or crimped coarse particles which can support the finer particles, and space them better.

It is desirable that shrinkage during drying of the microporous layer be minimized to prevent warping and to prevent the applied layer from pulling away from the bases of the corrugations. This is accomplished by applying the coating dispersion to the substrate in several applications, while removing the element from the suspension between each application, and applying a differential pressure across it of up to about 100 p.s.i., to set the layer before applying the next. Greater pressures are preferably avoided before solidification of the bonding agent in order to prevent any possible reorientation of the angularly oriented fibers. The liquid bonding agent, if any, contained in the dispersion can, if desired, be caused to solidify or cure between the several applications of the dispersion. Alternatively, solidification or curing can be effected after complete application.

The bonding agent can be flowed through the substrate after laydown of the layer as a final operation. The bonding agent also can be added to the dispersion before it is applied to the substrate. The bonding agent can also be incorporated in the microporous layer after deposition, if it has a deleterious effect upon the dispersion. It can for example be washed through the layer after the fluid has been drawn off, or it can be deposited on the surface of the microporous layer, whence it will spread by capillarity throughout all the layers.

After the application has been completed, adhesion is effected. The conditions necessary to accomplish this vary with the nature of the bonding agent. For example, the temperature can be raised to a point high enough to cause the cross linking or polymerization of the bonding agent or to cause the evaporation of the solvent in which the bonding agent is dissolved. Alternatively, where a thermoplastic material is used as the bonding agent the temperature can be increased to effect softening or fusion. A catalyzed resin can be allowed to stand at room temperature until the resin is set.

If it is necessary to raise the temperature of the coated product to cure or soften the binder, a curing oven can be provided, through which the substrate is passed after the deposition. The coated substrate can also be dried in this oven, if desired, to remove any remaining portion of the dispersing fluid. Alternatively, the bonding agent can be caused to solidify by passing heated air or other heated gases through the treated product.

The adhesion obtained between the microporous layer and the substrate is quite high. As a result, the strength of the final product is dependent primarily upon the strength of the substrate.

A convenient and meaningful test of the adhesion developed in the final microporous filter between the microporous layer and the substrate is as follows. The microporous filter is formed into a flat sheet having a surface area of one-twentieth square foot, the microporous layer being on the upper surface. The sheet is clamped in a leaktight device which permits fluid with which it is wetted, as for example, water or alcohol, to be held on the upper surface while the lower side is connected to a source of air pressure. Air is then gradually admitted to the lower side and the pressure measured. Ultimately, the pressure exerted by the air reaches the rupture point of the microporous layer, observed by the increased bubbling of the liquid. The maximum air pressure achieved before rupture is a measure of the adhesion.

When the average pore diameter of the microporous layer exceeds 0.3 microns, a considerable flow rate of air may be required to produce sufficiently high differential pressure to cause rupture. At such flow rates the differential pressure through the substrate alone may be significant and should therefore be subtracted from the total differential pressure at the flow rate which caused rupture. The remaining differential pressure is that which caused the rupture. At pore diameters below 0.3 micron, the differential pressure can safely be disregarded. A satisfactory microporous material should be capable of withstanding a pressure greater than about 3.5 p.s.i. Below this value, the adhesion is insufficient for a great many industrial applications. Preferably the microporous material should be capable of withstanding at least 6 p.s.i.

The voids volume of the microporous layer is determined by applying the layer in accordance with the teaching of this invention to a paper or other porous disc of known weight and thickness. The weight of the microporous layer is then determined by the difference in weight. The apparent volume of the microporous layer is determined by measurement of the area and thickness of the layer. The true volume of the microporous layer is determined by measurement of the area and thickness of the layer. The true volume is determined by fluid displacement techniques using a fluid capable of wetting all of the components of the product. The voids volume is then determined by the following equation:

$$\text{Voids volume} = 100 \times \left[ 1 - \frac{\text{true volume of layer}}{\text{apparent volume of layer}} \right]$$

Calculated by this method, the microporous materials produced by means of this invention preferably have microporous layers with voids volumes of at least 75 percent and in some instances 90 percent and even higher.

The pore size or diameter of the microporous filters of this invention was evaluated by the following test, which is substantially in accordance with the procedure of U.S. Pat. No. 3,007,334:

A disc of the material to be tested is wetted with a fluid, preferably ethyl alcohol, capable of wetting the microporous layer, and clamped between rubber gaskets. A fine screen is positioned above the disc, supporting it against upward movement. The volume above the disc is filled with the fluid. Air pressure is increased in the chamber below the disc until a stream of air bubbles is observed emerging from one point of the test piece. The effective pore diameter is then calculated by the formula:

$$\text{Pore diameter (microns)} = \frac{K}{\text{pressure (inches of water)}}$$

$K$ is determined by measuring the maximum spherical glass bead or iron carbonyl particle which passes through the element, in accordance with MIL-F-8815 (ASG) Paragraph 4, 7, 8 (Mar. 18, 1960), or the largest bacteria which passes through.

The pore diameter obtained by this method is the maximum pore diameter. By continuing to increase air pressure until the whole surface of the filter medium is bubbling (known as the "open bubble point"), the same constant can be used to compute an average diameter characteristic of most of the pores. Tests have shown that if air is passed at a velocity of 70 to 170 cm./min., the pressure necessary to achieve the open bubble point taken together with the $K$ value given above gives a value for the pore opening approximating the true average value. The ratio between the maximum pore size and the average pore size of the microporous media of this invention generally ranges from about 2:1 to about 4:1, a relatively small difference which greatly increases the safety and reliability of the product.

The following Examples, in the opinion of the inventors, represent preferred embodiments of the invention.

Example 1

A flat sheet of epoxy resin impregnated paper, having an average pore diameter greater than 25 microns and a thickness of 0.036 inch, was subjected to a compression or densification process at the locations of the future bases and tips of the corrugations that were to be formed. During the densification process, the thickness at these points was reduced to 0.026 inches. The corrugations were formed by a standard folding operation that imparted a corrugation base radius of 0.05 inch measured from the center of curvature of the fold on the upstream side of the substrate to the surface only of the substrate, and a tip radius of 0.03 inch measured from the center of curvature of the fold on the interior of the substrate to the upstream surface, including the thickness, of the substrate. The corrugated sheet was then formed into a substantially cylindrical shape joined in a reverse lapped side seam seal by a strip of epoxy resin bonding agent. The element was 9¾ inches long and had an internal diameter of 1¼ inches and an external diameter of 2½ inches. Twenty-five corrugations gave an outer surface area of 310 square inches. The two ends of the element were then placed in a clamp and sealed by means of silicone rubber gaskets, one of the gaskets having an opening communicating with the interior of the element and an effluent outlet port to permit drainage of fluids contained in the interior of the element.

The element, so prepared, was then placed in a vessel containing an anchoring layer dispersion. The anchoring layer dispersion was prepared by mixing 20 grams of a liquid bonding agent comprised of a liquid polyepoxide resin (p-aminophenyl-ethyl chlorohydrin) containing 40 percent by weight of a cyanoethylated primary aliphatic polyamine as a curing agent, 7 grams of potassium titanate fibers averaging 0.5 micron in diameter and 100 microns in length, and dispersing the mixture in 600 cc. of water containing 0.4 percent by weight of hydroxypropyl methyl cellulose. The resultant dispersion had a viscosity in excess of 50 centipoises and had an average droplet size of between 25 and 75 microns. A vacuum equivalent to 15 inches of mercury was then applied through the effluent outlet port to draw the dispersion through and cause the deposition of the particulate material and bonding agent on the external surface of the element.

A microporous layer dispersion was prepared by mixing 28 grams of amosite type amphibole asbestos fibers 0.5 micron in diameter by 300 microns long, 30 grams of the same bonding agent that was used in the anchoring dispersion, 80 grams of butyl carbitol, 28 grams of sodium carbonate, and 1.4 gram of Tamol 850, a water soluble organic dispersing agent, and dispersing the mixture in 14 liters of water. The resultant dispersion was partly emulsified having an average droplet size of 1.0 to 5.0 microns, and approximately 80 percent precipitated onto the fiber.

The open ends of the substrate cylinder were closed, and the microporous layer dispersion was then drawn through the sides in four separate applications, each application being equal to approximately 25 percent of the total applied and at an applied vacuum equal to 12 p.s.i. After each application, the element was removed from the pressure vessel and was subjected to an air pressure of 12 p.s.i. from the outside to compress the materials thus far applied.

After all of the microporous layer dispersion had been applied, hot air at a temperature of 400° F. was passed through for 5 minutes from the outside to the inside to dry the element and cure the resin. The element was then removed from between the clamps and metal and caps were affixed by means of a suitable adhesive.

The filter element thus prepared was found to have a maximum pore diameter of 4 microns, an average pore diameter of 1.5 microns, a water permeability of 1.6 gallon per minute per square foot at an applied pressure differential of 1 p.s.i. The adhesion was sufficient to withstand the application of up to 6 p.s.i. in the reverse direction, and the voids volume of the microporous layer was about 85 percent.

Example 2

The procedure of Example 1 was repeated except that crocidolite type amphibole asbestos averaging 0.1 by 100 microns was used in place of the amosite type in the microporous layer dispersion and in addition, 28 grams of sodium carbonate and 1.4 of a soluble organic surface active agent were added to the microporous layer dispersion.

The open ends of the corrugated tubular substrate were capped by end caps as shown in FIG. 6, bonded to the tube by an epoxy resin bonding agent in conventional fashion, and then the microporous layer dispersion applied, in increments, as in Example 1. The differential pressure of the air applied between increments was 40 p.s.i. The resulting product had a maximum pore diameter of 0.35 micron, an average pore diameter of 0.15 micron, and a water permeability of 0.4 gallon per minute per square foot at an applied pressure differential of 1 p.s.i. The adhesion was sufficient to withstand the application of up to 6 p.s.i. in the reverse direction and the voids volume of the microporous layer was about 90 percent.

Example 3

A flat sheet of epoxy resin impregnated paper, having an average pore diameter greater than 25 microns and a thickness of 0.030 inch, was subjected to a compression or densification process at the location of the future bases and tips of the corrugations that were to be formed. During the densification process, the thickness at these points was reduced to 0.022 inch. The corrugations were formed by a standard folding operation that imparted a corrugation base radius of 0.05 inch and a tip radius of 0.030 inch.

An anchoring dispersion was prepared by mixing 30 grams of a solid polyepoxide resin made by reacting Bisphenol A with epichlorohydrin in an alkaline solution having a melting point of 125°—135° C. a viscosity in a 40 percent weight solution in butyl carbitol at 25° C. of 18 to 28 poises, and an epoxide equivalent of 2000 —2500, and containing 25 percent by weight of m-phenylene diamine as a curing agent, 40 grams of trichloroethylene and 4 grams of potassium oleate. This mixture was added to 2 liters of water and thereafter 12 grams of glass fibers, averaging 5 microns in diameter by 500 microns long, were added.

A microporous layer dispersion was then prepared by mixing 27 grams of the same polyepoxide resin, 9 grams of the same amine, 36 grams of furfuryl alcohol, a reactive diluent for the resin also serving as a partial curing agent, 50 grams of butyl carbitol as a nonreactive diluent, 0.3 gram of an emulsifying agent (a polyethoxylated fatty acid mixture having acyl radicals derived from resin acids and having a molecular weight of about 700). This mixture was then added to a dispersion containing 18 grams of glass fibers averaging 1.5 microns by 200 microns, dispersed in 18 liters of water having a pH of 3.0, the pH having been adjusted with hydrochloric acid. The resultant slurry contained some emulsion having a droplet size of 2 microns. Approximately 80 percent of the resin was precipitated on the glass fibers.

The anchoring dispersion was then applied to the corrugated tube after closing off the open ends by passing it through the base at a pressure differential caused by the application of a vacuum equivalent to 12 inches of mercury. The microporous layer dispersion was then applied in 3 increments at a differential pressure of 12 p.s.i. The base was a paper substrate having a surface area of 310 square inches and an average pore size of 10 microns. Thereafter, the product was treated by passing hot air through it at a temperature of 350° C, at a rate of 7 cubic feet per minute per square foot for 30 minutes. The final product had a water permeability of 6 gallons per minute per square foot at 1 p.s.i. applied pressure differential, an average pore diameter of 3 microns, a maximum pore diameter of 9 microns, and an adhesion sufficient to withstand the application of 3.5 p.s.i. in the reverse direction. The voids content of the microporous layer was in excess of 90 percent.

Examples 4 to 6

An asbestos blend containing 20 percent long fiber washed filter grade as obtained from Johns-Manville PLASTIBEST No. 20 or Asbestos Corporations of America ACOA-3A and 80 percent short fiber having a Quebec test value of 0-0-0-16 (JM 7TG.) was dispersed in a Waring Blender at a consistency of 1500 mg./l. for 10 minutes. 300 mg. of sodium hexametaphosphate were added to prevent flocculation of the slurry. The substrate was an all cotton paper having a ream weight of 70 pounds (20 inches × 20 inches) and 0.033 caliper. The paper was impregnated with slurry to a weight of 6 grams of asbestos per square foot. The sheet was then checked for permeability with distilled water and the pore size determined as described above.

The microporous filter characteristics and the data taken are summarized in the Table below. Pore diameters are given in microns for the first and tenth bubble points and permeability is given in gallons per minute of water through the filters at a differential pressure of 10 pounds per square inch.

TABLE I

| Example No. | Percent asbestos | | (NaPO₃)₄, mg./liter | Weight impregnant, g./sq. ft. | Mixing time, minutes |
|---|---|---|---|---|---|
| | Short | Long | | | |
| 4 | 80 | 20 | 300 | 6 | 10 |
| 5 | 80 | 20 | 300 | 9 | 5 |
| 6 | 80 | 20 | 300 | 12 | 10 |

| Example No. | Permeability, g.p.m./sq. ft. (10 p.s.i.) | 1st pore diameter, microns | 10th pore diameter, microns |
|---|---|---|---|
| 4 | 1.45 | .34 | .26 |
| 5 | 1.65 | .26 | .22 |
| 6 | .45 | .21 | .18 |

The amount of impregnation was determined by two methods:

a. by microscopic examination of cross sections of the impregnated substrate.

b. by bubble pointing the material in the reverse direction and measuring the pressure required to reach the first bubble or break at which point the impregnant is forced out. This reverse bubble pointing was performed without a supporting screen (as it was required that the impregnant should be removed from the substrate by the measured air pressure).

It was found that for the examples given the greater the weight of the impregnating material, the smaller were the pores. The paper pores were practically filled by this material which extended through to within one or two fiber diameters to the downstream side of the paper.

Example 7

Two positive displacement pumps driven through variable speed gears were used to feed slurries to the sample of substrate to be impregnated. The consistency of the slurries was 0.01 percent of dry fiber weight. The output of each pump was such that with one pump running at maximum speed the flow rate through the substrate was 10 gpm. per square foot. The substrate used was cotton paper having a basic weight of 54 per 500 sheet ream, 20 inches × 20 inches, and 0.027 caliper. Impregnation was accomplished from the felt (i.e. more open) side of the paper. Pump A containing a fine dispersion of the short asbestos fibers of Examples 4 to 6 was made to pump a total of one liter through the paper over the time period for total impregnation.

For the initial 5 seconds full flow rate was maintained, after which the speed of the pump was reduced linearly to zero at 40 seconds. At the 5 second mark, pump B which contained a fibrous slurry of the long asbestos fibers of Examples 4 to 6 was started and the speed increased to full speed at 40 seconds. Flow was stopped when pump B had completed pumping 1 liter of slurry.

Total weight of fibers used was 4 per square foot of paper.
Permeability —6.4 gpm. per square foot at 10 p.s.i. differential pressure.
1st pore size 0.6 micron
10th pore size 0.27 Micron

Example 8

The procedure of Example 2 was repeated except that 1.4 grams of copper-8-hydroxy quinolate, a sparsely water soluble bactericidal agent, ground to an average particle size of 5 microns, was dispersed and included in the microporous layer dispersion. The product had the same pore dimensions and water permeability of the product of Example 2, and in addition, was bactericidal, the water filtrate obtained being bacteria-free.

Example 9

The procedure of Example 2 was repeated except that 1.4 grams of copper-8-hydroxy quinolate and 2.4 grams of silver bromide ground to an average particle size of 0.5 to 5 microns were dispersed and included in the coating dispersion. The product had the same pore dimensions and water permeability of the product of Example 2, and in addition, was bactericidal, the water filtrate obtained being bacteria-free.

Example 10

A filter was produced in accordance with Example 8, after which an outer coating of 900 mg. per square foot of silver bromide was applied. The dispersion for this consisted of 2 liters of water to which 1 gram of a wetting and dispersing agent (a polyethoxylated fatty acid mixture having acyl radicals derived from rosin acids and having a molecular weight of about 700) was added. To this was added the silver bromide, finely ground to 2.0 microns average particle size. The dispersion was deposited on the outer surface of the microporous coating using a differential pressure of 12 p.s.i. The filter was then dried at a temperature of 250° F. in an over. The product had the same pore dimensions and water permeability of the product of Example 2, and in addition, was bactericidal, the water filtrate obtained being bacteria-free.

Example 11

A flat sheet of epoxy resin-impregnated paper, having an average pore diameter of 25 microns and a thickness of 0.030 inch was fed into a corrugating machine in which the blade clearance was reduced at the base fold areas so that the thickness at the bases of corrugations (as shown in FIG. 4) was reduced to 0.024 inch. The base radius of curvature thus formed was 0.06 inch, and the tip radius was 0.030 inch. The corrugated sheet was then formed into a substantially cylindrical shape joined in a reverse lapped side seam seal by a strip of epoxy resin bonding agent. The element was 9¾ inches long and had an internal diameter of 1¼ inch and an external diameter of 2½ inches. Twenty corrugations gave the outer surface an area of 240 square inches. The two ends of the element were then placed in a clamp and the element coated following the procedure of Example 1 for deposition of the anchoring layer.

The microporous layer dispersion was prepared by dispersing 14 grams of quartz fibers having an average diameter of 2 microns and average length of 500 microns in 14 liters of water containing 0.4 percent by weight of hydroxymethyl cellulose. To this dispersion was added 5 grams of the same bonding agent that was used in the anchoring layer. After this resin was precipitated on the quartz by its addition to the aqueous dispersion, 20 grams of an ion exchange resin (styrene-divinyl benzene beads containing Amberlite IRA 400 sulfonic acid resin hydroxide form and Amberlite IR 120 quaternary ammonium hydroxide resin hydrogen form) granulated to a size of 1 to 50 microns was added to the dispersion. This dispersion was applied in 4 equal increments at a differential pressure of 2 p.s.i. Thereafter the product was cured as in Example 3. The final product had a water permeability of 3 gallons per minute per square foot at 1 p.s.i. applied pressure differential, an average pore diameter of 8 microns and a maximum pore diameter of 18 microns. The voids content of the microporous layer was 75 percent and the adhesion was sufficient to withstand the application of 3.5 p.s.i. in the reverse direction.

Example 12

A composite flat sheet of stainless steel woven wire mesh was fabricated by sintering together (in accordance with U.S. Pat. No. 2,925,650) a drainage layer of 32 inches × 32 inches square weave mesh with wire diameter 0.011 inch, to an upstream layer of 120 inches × 120 inches square weave mesh with 0.0045 inch wire diameter. This was corrugated following Example 1. Before forming into a cylindrical shape, the bases of the corrugations in the area indicated in FIG. 4 were roller coated with an epoxy resin solution containing 60 grams of the same liquid bonding agent used in Example 1, 40 grams of the aliphatic amine curing agent and 250 grams of methyl ethyl ketone. By applying a radiated temperature of 350° F. from the downstream side of the corrugation, the solvent was preferentially evaporated at the bases of the corrugations leaving sufficient resin to cause a 20 percent reduction in mesh permeability at those areas.

The cylindrical element was formed with a reverse lapped side seam and clamp sealed ready for coating as in Example 1. The element dimensions including surface area were the same as in Example 1.

The microporous layer was prepared by dispersing 25 grams of Johns-Manville Hyflo-supercel diatomaceous earth and 15 grams of glass fiber having 9 microns average diameter and 1000 microns average length in a solution consisting of 140 grams of butyl carbitol, 4 grams of butyl acetate, 2 grams of potassium oleate, and 20 grams of water, 120 grams of the above-mentioned liquid bonding agent and 80 grams of the curing agent. This inorganic/resin/solvent dispersion was then dispersed in 5 liters of water containing 30 grams of dissolved potassium oleate. The average resin droplet size, where not precipitated on the inorganic particles, was 2—6 microns.

This dispersion was applied in four equal increments forming four separate layers to the outer surface of the convoluted mesh cylinder by applying a differential pressure by of 15 inches of mercury. Each layer was compressed by applying a differential air pressure of 25 inches of mercury before laydown of the next, to set the layer. The resin was cured at 320° F. in 45 minutes in an oven.

It was found that the coating was able to withstand a reverse differential pressure of 3 p.s.i. Its adhesion was therefore acceptable without the use of a separate anchoring layer.

The product so produced had an average pore diameter of 0.4 microns, a maximum pore diameter of 5 microns, and the water permeability was 0.8 gallon per minute per square foot at a differential pressure of 1 p.s.i.

Example 13

The procedure of Example 12 was followed with the exception of the method of reducing porosity at the bases of the corrugations.

The corrugated substrate was immersed in an epoxy resin solution containing 30 grams of the bonding agent and 20 grams of the curing agent, and 250 grams of methyl ethyl ketone. The solvent was dried by applying a radiated temperature of 350° F. from the downstream side, causing the resin solution to migrate to the base folds and causing a 20 percent reduction in mesh permeability there.

Example 14

The procedure of Example 1 was repeated except in the method of reducing porosity at the bases of the corrugations.

The sheet of substrate was coated with a thixotropic resin dispersion in the base fold areas shown in FIG. 1. The dispersion was prepared by mixing 10 grams of colloidal silica having 0.05 micron average particle size with 24 grams of bonding agent and 16 grams of the curing agent, as used in Example 1. The amount of resin dispersion applied was limited to 300 mg. per square inch of area thus coated. The resin caused 15 percent reduction in permeability at the base of the folds. Anchoring and microporous layers were applied as in Example 1 and the finished product had the same permeability, pore size and adhesion as was obtained in Example 1.

Having regard to the foregoing disclosure, the following we claim as the inventive and patentable embodiments thereof:

1. A corrugated microporous filter element having a maximum pore diameter of 25 microns, comprising a porous substrate sheet formed in corrugation folds having bases with a radius of curvature of at least 0.025 inch and of a porosity at least 10 percent less than the porosity of all remaining areas of the sheet, and a microporous layer laid down on said sheet by fluid deposition after corrugation.

2. A corrugated microporous filter element in accordance with claim 1 wherein the microporous layer is coated on the substrate sheet.

3. A corrugated microporous filter element in accordance with claim 2 wherein the microporous layer is supported within the pores of the substrate sheet.

4. A corrugated microporous filter element in accordance with claim 2 wherein the microporous layer is coated on and supported within the pores of the substrate sheet.

5. A corrugated microporous filter element in accordance with claim 2 wherein the microporous layer is adhered to the substrate sheet by a bonding agent.

6. A corrugated microporous filter element in accordance with claim 5 wherein the microporous layer is in admixture with a particulate material.

7. A corrugated microporous filter element in accordance with claim 2 wherein the microporous layer comprises at least 25 percent fibrous material by weight.

8. A corrugated microporous filter element in accordance with claim 1 wherein the substrate sheet is a paper.

9. A corrugated microporous filter element in accordance with claim 1 wherein the substrate sheet is a wire mesh.

10. A corrugated microporous filter element in accordance with claim 1 wherein said microporous layer comprises a bactericidal agent.